(12) United States Patent
Lussier et al.

(10) Patent No.: US 10,688,733 B2
(45) Date of Patent: Jun. 23, 2020

(54) METHOD AND APPARATUS FOR THREE-DIMENSIONAL PRINTING

(71) Applicant: THE BOEING COMPANY, Chicago, IL (US)

(72) Inventors: Matthew Lussier, Simi Valley, CA (US); Jeffrey H. Hunt, Thousand Oaks, CA (US)

(73) Assignee: THE BOEING COMPANY, Chicago, IL (US)

( * ) Notice: Subject to any disclaimer, the term of this patent is extended or adjusted under 35 U.S.C. 154(b) by 717 days.

(21) Appl. No.: 14/952,055

(22) Filed: Nov. 25, 2015

(65) Prior Publication Data

US 2017/0144371 A1 May 25, 2017

(51) Int. Cl.
| | | |
|---|---|---|
| *B29C 67/00* | (2017.01) | |
| *B33Y 10/00* | (2015.01) | |
| *B33Y 50/02* | (2015.01) | |
| *B23K 26/342* | (2014.01) | |
| *B23K 26/03* | (2006.01) | |
| *B23K 26/064* | (2014.01) | |
| *B29C 64/153* | (2017.01) | |

(Continued)

(52) U.S. Cl.
CPC ........ *B29C 67/0077* (2013.01); *B23K 26/032* (2013.01); *B23K 26/064* (2015.10); *B23K 26/342* (2015.10); *B29C 64/153* (2017.08); *B29C 64/20* (2017.08); *B29C 64/386* (2017.08); *B33Y 10/00* (2014.12); *B33Y 50/02* (2014.12); *B28B 1/001* (2013.01); *B29K 2025/06* (2013.01); *B29K 2077/00* (2013.01); *B29K 2105/251* (2013.01); *B33Y 30/00* (2014.12)

(58) Field of Classification Search
CPC ......... B33Y 10/00; B33Y 30/00; B33Y 50/00; B33Y 50/02
See application file for complete search history.

(56) References Cited

U.S. PATENT DOCUMENTS

| | | |
|---|---|---|
| 4,938,816 A | 7/1990 | Beaman et al. |
| 5,121,329 A | 6/1992 | Crump |

(Continued)

FOREIGN PATENT DOCUMENTS

| | | |
|---|---|---|
| CN | 101960385 A | 1/2011 |
| WO | 2014200851 A2 | 12/2014 |

OTHER PUBLICATIONS

Chinese Office Action for Application No. 201611009604.8 dated Feb. 3, 2020.

*Primary Examiner* — Ryan M Ochylski
(74) *Attorney, Agent, or Firm* — Patterson + Sheridan, LLP

(57) ABSTRACT

The present disclosure generally relates to method and apparatuses for 3D printing. The apparatuses include a stationary workpiece stage and an optics assembly adapted to direct laser energy to different locations on the workpiece stage. The optics assembly includes one or more of an intensity-controlling mechanism, a polarization mechanism, a shape-controlling mechanism, and a beam-steering mechanism configured to direct laser energy towards the workpiece stage. The method includes directing an energy beam from a laser towards a workpiece stage while adjusting the direction of the energy beam, adjusting the intensity of the energy beam, adjusting the shape of the energy beam, or adjusting the polarization of the energy beam.

20 Claims, 5 Drawing Sheets

(51) Int. Cl.
    *B29C 64/20*      (2017.01)
    *B29C 64/386*     (2017.01)
    *B28B 1/00*           (2006.01)
    *B33Y 30/00*          (2015.01)
    *B29K 77/00*          (2006.01)
    *B29K 25/00*          (2006.01)
    *B29K 105/00*         (2006.01)

(56)            References Cited

U.S. PATENT DOCUMENTS

| | | | |
|---|---|---|---|
| 5,155,324 A | 10/1992 | Deckard et al. | |
| 5,198,159 A * | 3/1993 | Nakamura | B29C 64/135 |
| | | | 156/273.5 |
| 8,282,377 B2 | 10/2012 | Higashi et al. | |
| 8,828,116 B2 | 9/2014 | Fuwa | |
| 2009/0140466 A1* | 6/2009 | Kuzusako | B33Y 50/00 |
| | | | 264/406 |
| 2011/0001950 A1* | 1/2011 | DeVoe | G03F 7/2053 |
| | | | 355/67 |
| 2011/0061591 A1 | 3/2011 | Stecker | |
| 2015/0183168 A1* | 7/2015 | Liverman | B29C 64/386 |
| | | | 264/401 |
| 2015/0378242 A1* | 12/2015 | Auxier | G02F 1/0118 |
| | | | 385/8 |
| 2017/0036398 A1* | 2/2017 | Gumennik | B29C 67/0066 |
| 2017/0261743 A1* | 9/2017 | Kim | G02B 26/127 |

\* cited by examiner

METHOD AND APPARATUS FOR THREE-DIMENSIONAL PRINTING

BACKGROUND

Field

Aspects of the present disclosure generally relate to a methods and apparatus for three-dimensional printing.

Description of the Related Art

Three-dimensional (3D) printing, also known as additive manufacturing, is any of various processes used to synthesize a three-dimensional object. In 3D printing, successive layers of material are laid down under computer control. These objects can be of almost any shape or geometry, and are produced from a 3D model or other electronic data source. One example of 3D printing is selective laser sintering. In selective laser sintering, a laser is directed towards a base material, and upon absorption of the laser energy by the base material, the base material is melted. The base material is allowed to resolidify, thus forming a desired shape or configuration. The ability of the material to melt is strongly dependent on the power and intensity of the laser. To facilitate manufacturing of detailed objects, the laser energy must be confined to a small area. Moreover, the relationship between the spot size of the laser at the material interface, and the dwell time of the laser, is non-linear, further affecting the precision of manufacturing.

Conventional approaches attempt to overcome the above issues by fixing the laser in one location, and moving a stage having the base material thereon relative to the laser. While such an approach obviates some of the issues with respect to precision of manufacturing noted above, the fixed laser results in several drawbacks. Notably, because the stage must move back and forth relative to the laser, the size of a workpiece which can be manufactured is limited by the size of the stage and the area available for the stage to move within. Moreover, the speed of manufacturing is limited by the rate at which the stage can be moved during the 3D printing operation.

Based on the foregoing, there is a need for an improved method and apparatus for 3D printing.

SUMMARY

The present disclosure generally relates to method and apparatuses for 3D printing. The apparatuses include a stationary workpiece stage and an optics assembly adapted to direct laser energy to different locations on the workpiece stage. The optics assembly includes one or more of an intensity-controlling mechanism, a polarization mechanism, a shape-controlling mechanism, and a beam-steering mechanism configured to direct laser energy towards the workpiece stage. The method includes directing an energy beam from a laser towards a workpiece stage while adjusting the direction of the energy beam, adjusting the intensity of the energy beam, adjusting the shape of the energy beam, or adjusting the polarization of the energy beam.

In one aspect, a three-dimensional printing apparatus comprises a workpiece support for supporting a base material thereon; a laser for supplying laser energy to the base material; an imaging device for capturing an image of the base material; a controller for receiving image data from the imaging device; and an optics assembly coupled to the controller and adapted to receive instructions therefrom. The optics assembly comprises a shape-controlling mechanism; a polarization mechanism; and an intensity controlling mechanism.

In another aspect, a three-dimensional printing apparatus comprises a workpiece support for supporting a base material thereon; a laser for supplying laser energy to the base material; an imaging device for capturing an image of the base material; a controller for receiving image data from the imaging device; and an optics assembly coupled to the controller and adapted to receive instructions therefrom. The optics assembly comprises a beam-steering mechanism comprising a plurality of actuatable mirrors; a shape-controlling mechanism comprising one or more rotatable housings each having a circular opening formed therein for accommodating the laser energy; a polarization mechanism comprising one or more rotatable polarization sensitive elements; and an intensity controlling mechanism.

In another aspect, a method of adjusting a laser during a 3D printing operation comprises directing laser energy from a printing source to a base material on a stationary workpiece support; capturing an image of an impingement location of the laser energy on the base material; and providing image data of the captured image to a controller. In response to the controller receiving the image data, instructions are provided from the controller to the printing source to adjust one or more parameters of the printing source; and one or more parameters of the printing source are adjusted.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, and the disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

The present disclosure generally relates to method and apparatuses for 3D printing. The apparatuses include a stationary workpiece stage and an optics assembly adapted to direct laser energy to different locations on the workpiece stage. The optics assembly includes one or more of an intensity-controlling mechanism, a polarization mechanism, a shape-controlling mechanism, and a beam-steering mechanism configured to direct laser energy towards the workpiece stage. The method includes directing an energy beam from a laser towards a workpiece stage while adjusting the direction of the energy beam, adjusting the intensity of the energy beam, adjusting the shape of the energy beam, or adjusting the polarization of the energy beam.

Figure 1:
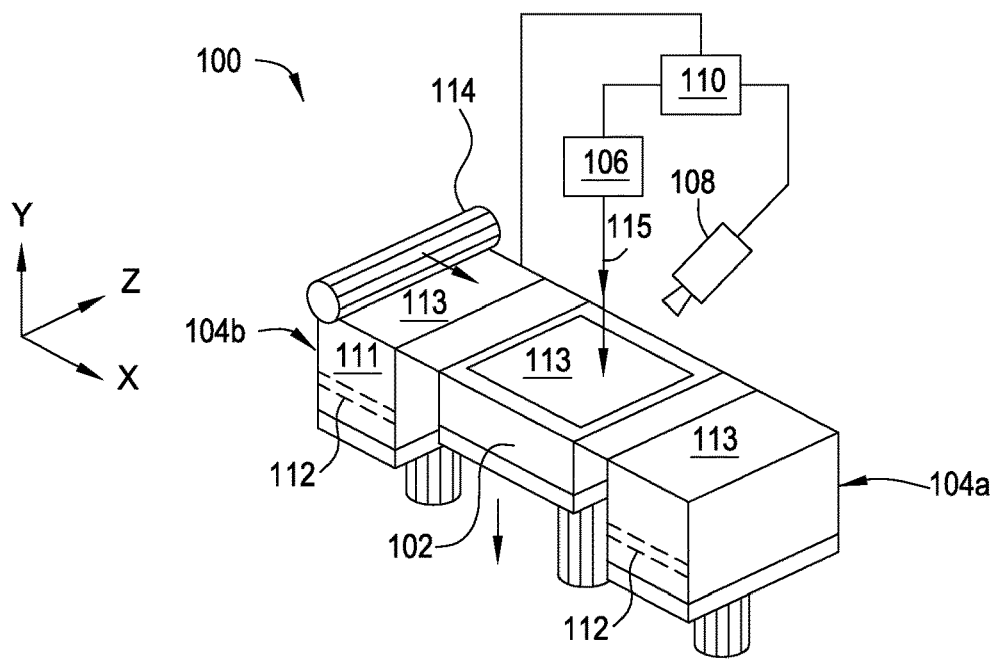
FIG. 1 is a schematic perspective view of a 3D printing apparatus, according to one aspect of the disclosure.

FIG. 1 is a schematic perspective view of a 3D printing apparatus 100, according to one aspect of the disclosure. The 3D printing apparatus 100 includes a workpiece support 102 and one or more material feed cartridges 104a, 104b (two are shown) adjacent to the workpiece support 102. A printing source 106 and an imaging device 108, such as a camera, are positioned above and directed towards the workpiece support 102. A controller 110 is coupled to components of the 3D printing apparatus 100, including the printing source 106 and the imaging device 108, to facilitate control of components during 3D printing operations.

Each of the one or more material feed cartridges 104a, 104b includes container 111 for storing a base material 113 from which 3D objects are formed. In one example, the base material 113 may include one or more of metals or ceramics, such as polymers including nylon and polystyrene, metals such as steel, titanium, or other alloys, and ceramics, among other materials. The base material 113 may be a powder having a particle size between about 20 microns and about 70 microns. The one or more material feed cartridges 104a, 104 include actuatable floor plates 112 driven vertically by actuators (not shown). Actuation of the floor plates 112 raises the level of the base material 113 within the material feed cartridges 104a, 104b. With the base material 113 in an elevated position, a feed roller 114 is moved longitudinally (in the X-direction) to push or carry base material 113 from a material feed cartridge 104a or 104b to the workpiece support 102. The upper support surface of the workpiece support 102 is adapted to actuate vertically, for example downward, to accommodate the transferred base material 113, thus maintaining a coplanar upper surface of the workpiece support 102 with the material feed cartridges 104a, 104b upon transfer of the base material 113. Moreover, vertical actuation of the workpiece support 102 maintains the upper surface of the workpiece support 102 at a consistent location to facilitate consistency during manufacturing of 3D objects. In one example, the workpiece support surface may be incrementally lowered about 0.002 inches to about 0.008 inches per re-feed from the feed roller 114.

During operation, laser energy 115 is directed from the printing source 106 to the workpiece support 102. Base material which is located on the workpiece support 102 is selectively melted by the laser energy 115 and allowed to resolidify. The printing source 106 is adapted to direct laser energy across the entire surface of the workpiece support 102, thus allowing the workpiece support 102 to remain stationary during processing, and thereby overcoming many of the manufacturing speed issues of conventional apparatuses and techniques. The imaging device 108 is directed towards the workpiece support 102 and captures an image of the workpiece support 102 as well as the laser energy contact location upon the workpiece support 102. Data from the imaging device 108 is transferred to the controller 110 to facilitate consistent processing of base material 113 on the workpiece support 102. In response to receiving data from the imaging device 108, the controller 110 may make one or more adjustments to parameters of the printing source 106.

While FIG. 1 illustrates one aspect of a 3D printing apparatus 100, other aspects are also contemplated. For example, it is contemplated that the 3D printing apparatus 100 may include more than one imaging device 108. Additionally, it is contemplated that the printing source 106 may be positioned above the workpiece support 102 and located centrally thereto, or may be positioned off-center. In an aspect where the printing source 106 is positioned off-center, it is contemplated that an imaging device 108 may be positioned centrally above the workpiece support.

Figure 2A:
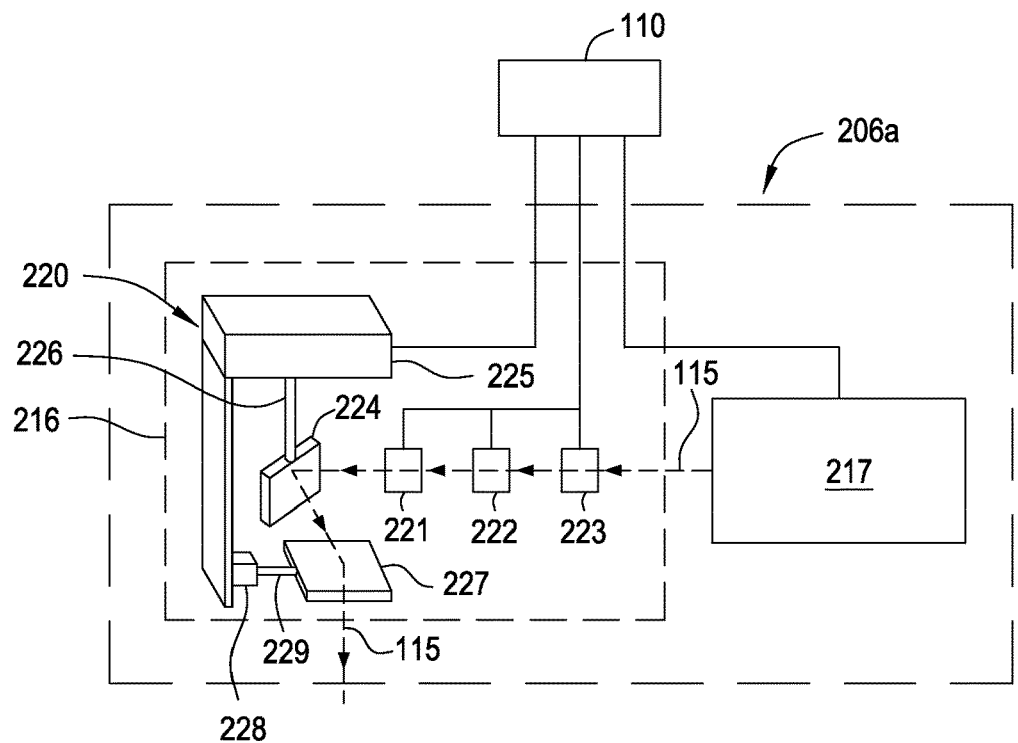
FIG. 2A is a schematic illustration of an energy source, according to one aspect of the disclosure.

FIG. 2A is a schematic illustration of a printing source 206a, according to one aspect of the disclosure. The printing source 206a is similar to the printing source 106 of FIG. 1, and may be utilized interchangeably therewith. The printing source 206a includes an optics assembly 216 and a laser 217, such as a high-power carbon dioxide laser. It is contemplated that the power level of the laser 217 may be adjusted to accommodate base materials of different compositions. In one example, the laser 217 may have a power level of about 1 Watt to about 10 Watts, but other power levels are contemplated. Additionally or alternatively, the amplitude profile of the laser may be selected such that the profile does not include gaps of holes in the power application. For example, the amplitude profile may be Gaussian, Lorentzian, top hat, or similar. The optics assembly 216 is adapted to receive laser energy 115 from the laser 217 and direct the laser energy 115 towards the workpiece support 102, shown in FIG. 1. The optics assembly 216 includes one or more of a beam-steering mechanism 220, a shape-controlling mechanism 221, a polarization mechanism 222, and an intensity controlling mechanism 223. It is to be noted that the shape-controlling mechanism 221, the polarization mechanism 222, and the intensity controlling mechanism 223 may be arranged in any sequential order, and are not limited to the sequence illustrated in FIG. 2A. One or more components of the printing source 206a may be coupled to a controller 110 to facilitate control of the respective components.

The beam-steering mechanism 220 includes a first mirror 224 coupled to an actuator 225 through a connecting rod 226. The actuator 225 rotates the connecting rod 226, and thus the mirror 224, to change the direction in which the laser energy 115 is reflected from the mirror 224 in the X-Z plane. Similarly, the beam-steering mechanism 220 also includes a second mirror 227 coupled to an actuator 228 via a connecting rod 229. The actuator 228 rotates the mirror 227 about the longitudinal axis of the connecting rod 229, to change the direction in which the laser energy 115 is reflected from the mirror 227 in the Y-X plane. The actuators 225, 228 are connected to the controller 110 and adjust the position of mirrors 224, 227 in response to instructions received from the controller 110. Using the beam-steering mechanism 220, the laser energy 115 can be directed to all areas of the workpiece support surface, without moving the workpiece support 102 relative to the printing source 206a.

During operation, as the laser energy 115 travels through the optics assembly 216 en route to the workpiece support 102 (shown in FIG. 1), each of the beam-steering mechanism 220, the shape-controlling mechanism 221, the polarization mechanism 222, and the intensity controlling mechanism 223 adjust one more properties of the laser energy 115. The adjustment of the properties facilities improved processing of the base material 113, resulting in increased precision of 3D printed objects. The shape-controlling mechanism 221, the polarization mechanism 222, and the intensity-controlling mechanism 223 compensate for changes in trajectory, beam path length, beam intensity, and beam shape as the laser energy 115 is directed to different locations on the workpiece support 102, thus facilitating consistent processing of a base material 113 on a workpiece support 102 as the laser energy 115 moves relative to the workpiece support 102. It is contemplated that similar types of mirror or lens devices, such as digital micromirror devices, may additionally or alternatively be utilized to direct the laser energy 115 in response to instructions received from the controller 110.

Figure 2B:
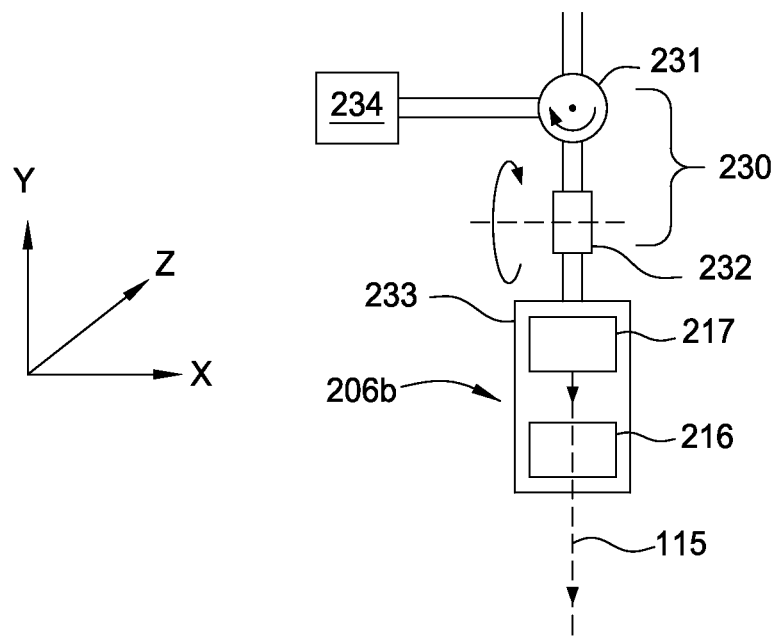
FIG. 2B is a schematic illustration of an energy source, according to another aspect of the disclosure.

FIG. 2B is a schematic illustration of a printing source 206b, according to another aspect of the disclosure. The printing source 206b is similar to the printing source 206a; however, the optics assembly 216 of the printing source 206b does not include a beam-steering mechanism. Instead, a directional mount 230 is utilized to support the printing source 206b. In response to receiving signals from a controller 110 (shown in FIG. 2A), the entire printing source 206a is moved to direct the laser energy 115 to a desired location. The directional mount 230 is coupled to a housing 233 containing therein a laser 217 and an optics assembly 216. The directional mount 230 includes a first coupling 231 to facilitate rotational movement of the housing 233 in the Y-X plane, and a second coupling 232 to facilitate rotational movement of the housing 233 in the Y-Z plane. Movement of the housing 233 results in trajectory changes to the laser energy 115. The first coupling 231 and the second coupling 232 may be coupled to an actuator 234 to facilitate actuation of the first coupling 231 and the second coupling 232. Alternatively, the actuator 234 may be contained within each of the first coupling 231 and the second coupling 232. It is contemplated that the first coupling 231 and the second coupling 232 may optionally be replaced with a ball joint or other similar multi-directional coupling.

Figure 2C:
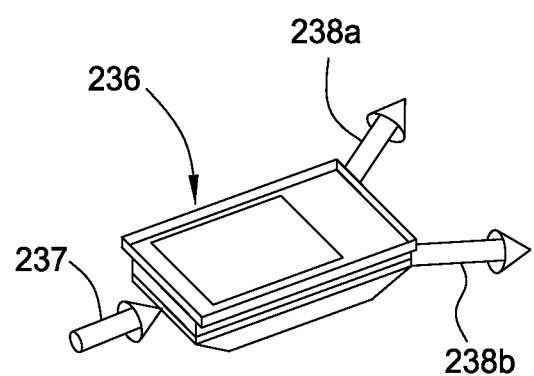
FIG. 2C is a schematic illustration of a beam-steering mechanis according to another aspect of the disclosure.

FIG. 2C is a schematic illustration of a beam-steering mechanism 236, according to another aspect of the disclosure. One or more beam-steering mechanisms 236 may be used in addition to or as an alternative to the beam-steering mechanism 220 illustrated in FIG. 2A. The beam-steering mechanism 236 is a steerable electro-evanescent optical refractor which utilizes the unparalleled electro-optic effect of liquid crystals to redirect incoming radiation. The exiting radiation is steered via a voltage tunable Snell's law refraction, either with one or more prism electrodes (horizontal) or an electrode and out-coupling prism (vertical). In one example, laser energy enters the beam-steering mechanism as illustrated by arrow 237 and may be redirected as illustrated by arrows 238a or 238b, or on any trajectory therebetween, depending on the applied voltage. The application of voltage may be controlled by the controller 110 (shown in FIG. 1). While FIG. 2C illustrates one aspect of a non-mechanical beam steering device, it is to be noted that other non-mechanical beam steering devices are also contemplated.

Figure 3A:
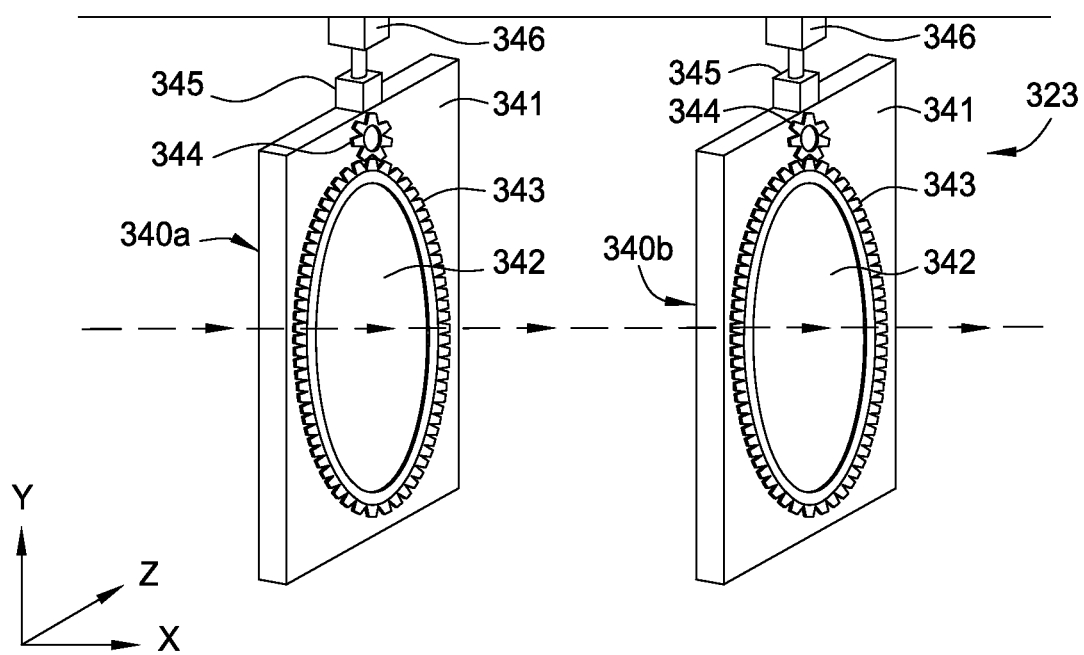
FIG. 3A is a schematic illustration of an intensity-controlling mechanism, according to one aspect of the disclosure.

FIG. 3A is a schematic illustration of an intensity-controlling mechanism 323, according to one aspect of the disclosure. The intensity-controlling mechanism 323 is similar to the intensity-controlling mechanism 223 and may be used interchangeably therewith. The intensity-controlling mechanism 323 includes one or more (two are shown) adjustable polarization units 340a, 340b. Each of the adjustable polarization units 340a, 340b, includes a housing 341 having a polarization sensitive element 342 secured therein. The polarization sensitive element 342 may have gear teeth 343 formed on or coupled to the radially-outward edges thereof. The gear teeth 343 engage respective drive gears 344, which are driven by actuators 345 to facilitate rotation of each polarization sensitive element 342. In one example, each polarization sensitive element 342 may include one or more wave plates or polarizers, such as half wave or quarter wave plates, which may be selectively rotated to allow a predetermined amount of radiation therethrough. Additionally, each housing 341 of the adjustable polarization units 340a, 340b, may be coupled to an actuator 346 to selective move each polarization sensitive element 342 out of the optical path, as desired.

While FIG. 3A illustrates one example of an intensity-controlling mechanism, other examples are also contemplated. For example, it is contemplated that one or more of the adjustable polarization units 340a, 340b may be replaced with a variable optical filter, for example circular variable optical filters, or other electro-optical system, such as a crossed polarizer/pocket cell combination, to control the intensity of the laser energy 115. Additionally or alternatively, it is contemplated that the intensity of the laser energy 115 may be controlled by adjusting the power application to the laser 217.

Adjustment of the intensity of the laser energy 115 promotes consistent processing of a base material. Because the laser energy 115 is directed about the workpiece support 102 during processing, the path length of the laser energy, among other variables, is constantly changing, thus affecting the precise amount of laser energy provided at each location on the workpiece support. However, the intensity of the laser energy 115 can be adjusted to result in a uniform power application across the entire area of the workpiece support 102. As described above, the intensity of the laser energy may be adjusted in response to feedback from an imaging device 108 and instructions from a controller 110. Thus, adjustments to the intensity of the laser energy 115 as dictated by the controller 110 compensate for changes in intensity due to the changing path length, or other variables, of the laser energy 115 during processing. It is contemplated that intensity adjustments may be utilized to either increase or decrease the intensity of the laser energy 115.

A polarization mechanism, such as the polarization mechanism 222 shown in FIG. 2, may have a similar structure to that of the intensity-controlling mechanism 323 shown in FIG. 3A. The one or more polarization sensitive elements of the polarization mechanism 222 may be manufactured to provide the desired polarization to the laser energy 115. In one example, it is contemplated that the polarization mechanism 222 and the intensity-controlling mechanism 323 may be combined into a single unit, or the respective functions may be performed by a single unit. In another aspect, the polarization mechanism may include a plurality of axially aligned rotatable polarization sensitive elements.

Adjustment of the polarization of the laser energy 115 promotes consistent processing of a base material, thus resulting in more precise manufacturing of 3D objects. As the laser energy 115 is moved about the base material to form an object, the polarization of the laser energy with respect to the surface of the base material may vary due to non-normal impingement of the laser energy 115. The variance in impingement may result in absorptive differences that lead to inconsistent processing, thus affecting the quality of the printed article. For example, S and P polarizations (e.g., perpendicular or parallel to the plane of incidence) may have differences levels or absorption and/or reflectance, thus resulting in inconsistent processing unless corrected.

Figure 3B:
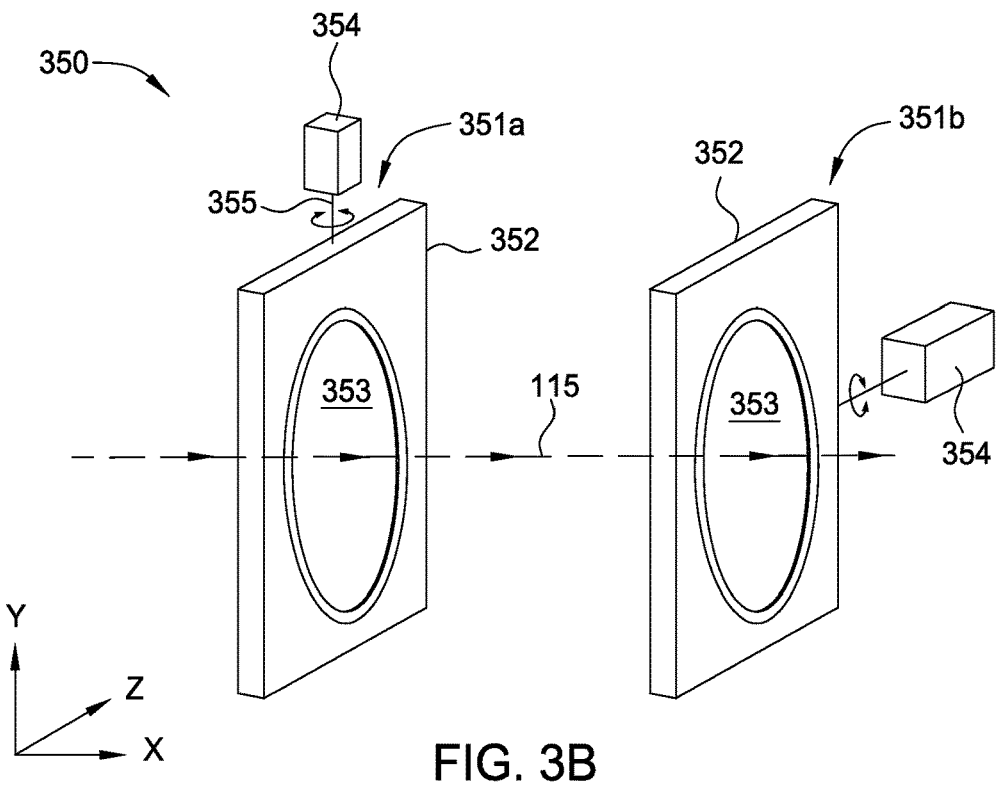
FIG. 3B is a schematic illustration of a shape-controlling mechanism, according to one aspect of the disclosure.

FIG. 3B is a schematic illustration of a shape-controlling mechanism 350, according to one aspect of the disclosure. The shape-controlling mechanism 350 may be used in place of the shape-controlling mechanism 221. The shape controlling mechanism 350 includes one or more (two are shown)

beam-shaping devices 351a, 351b. Each beam-shaping device 351a, 351b includes a housing 352 having a circular opening 353 formed therein. Each circular opening 353 is sized to allow passage of laser energy 115 through when a plane of the housing 352 is normal to the laser energy 115. The beam-shaping devices 351a, 351b also include actuators 354 coupled to the housings 352 via a connecting rod 355. The actuators 354 are adapted to rotate the housings 352 about an axial axis of the connecting rods 355 in order to adjust the planar orientation of the housings 352. In this manner, the shape-controlling mechanism 350 comprises multiple rotatable housings 352 that rotate about different axes.

Absent a shape-controlling mechanism, a circular beam profile results in illumination of an elliptical shape on the base material 113 at high angles of incidence, thus causing lower average power over the illuminated area. The shape-controlling mechanism 350 adjusts the beam profile to facilitate a consistent circular shape of illumination on the base material 113 during a 3D printing operation. In one example, adjustment of the planar orientation of the housings 352 results in the circular openings 353 defining elliptical shapes in a plane perpendicular to the laser energy 115. As the laser energy 115 passes through the partially rotated housings 352, a portion of the laser energy 115 is blocked by the housings 352 resulting in the beam of the laser energy 115 having an elliptical or non-circular sectional shape. The elliptical or non-circular shape is selected such that beam profile on the illumination surface is circular, even for relatively high angles of incidence.

The actuators 354 of the beam-shaping devices 351a, 351b are positioned at 90 degree angles with respect to one another to facilitate rotation about different axis to provide greater control over adjustments in beam shape. It is contemplated that angles other than 90 degrees may also be utilized. In one example, the housing 352 of the beam-shaping device 351a is rotated about the Y-axis, while the housing 352 of the beam-shaping device 351b is rotated about the Z-axis. The housings 352 may be formed from a material suitable to withstand the energy delivered by the laser energy 115.

Adjustment of the beam shape of the laser energy 115 promotes consistent processing of a base material. During processing, the angle of incidence between the laser energy 115 and the base material will vary as the laser energy 115 is moved across the base material. As the angle of incidence increases, the laser energy 115 is projected onto the base material with an elliptical shape, rather than a circular shape, resulting in inaccurate and inconsistent processing of a base material. The shape-controlling mechanism 350 adjusts the shape of the beam of the laser energy 115 to facilitate consistent processing, while the intensity controlling mechanism 323 may compensate for partial energy blockage by the shape-controlling mechanism 350 to facilitate consistent energy delivery to the base material 113.

Figure 3C:
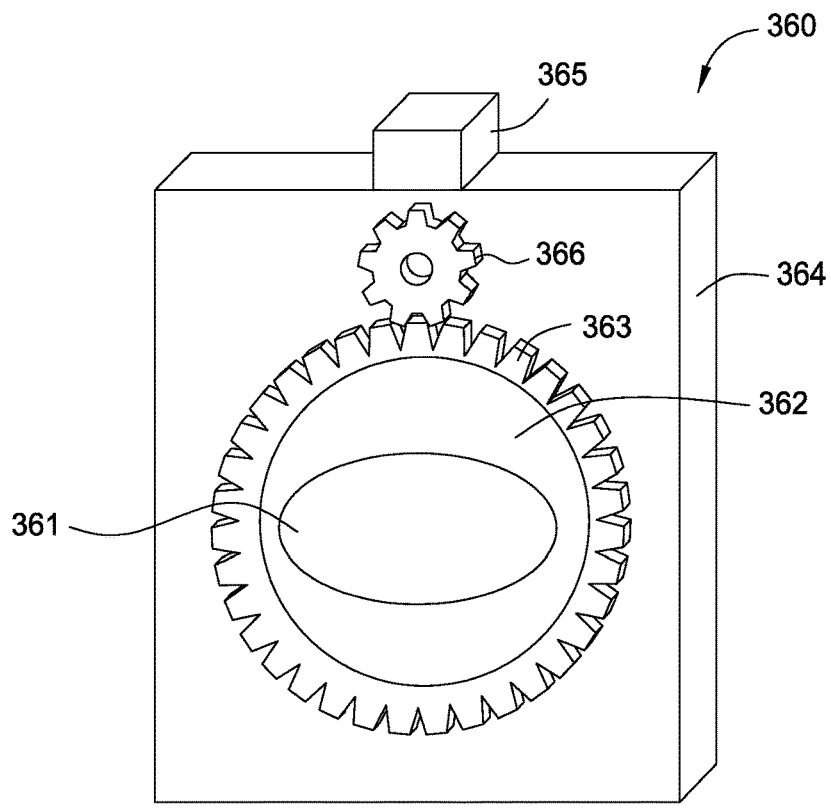
FIG. 3C is a partial schematic illustration of illustration of a shape-controlling mechanism, according to one aspect of the disclosure.

FIG. 3C is a partial schematic illustration of illustration of a shape-controlling mechanism 360, according to another aspect of the disclosure. The shape-controlling mechanism 360 may be used in addition to or as an alternative to the shape-controlling mechanism 350. The shape-controlling mechanism includes an elliptical-shaped lens 361 disposed in a circular lens support 362. The lens support 362 includes gear teeth 363 coupled to an outer radial edge thereof. The lens support 362 is rotatably positioned in a housing 364. The lens support 362, and thus the elliptical-shaped lens 361, is rotationally driven via an actuator 365 through a gear 366 in engagement with the gear teeth 363.

The elliptical-shaped lens 361 is configured to focus light in a single direction. For example, light traveling perpendicular to the plane of the housing 364, e.g., the Z-axis, may be focused only with respect to the X-axis and not the Y-axis. Such one directional focusing allows for changes in beam shape, thus correcting for changes in beam projection shape upon a base material. Moreover, utilizing an elliptical-shaped lens 361 may provide an additional benefit in that the elliptical-shaped lens 361 changes the beam shape without blocking portions of the beam, thereby mitigating intensity corrections due to changes in beam shape. One or more successive elliptical lenses may be utilized to generate the desired beam shape. Additionally or alternative, the shape-controlling mechanism may include other specialized lens shapes optimized to generate a predetermined intensity profile.

Figure 4:
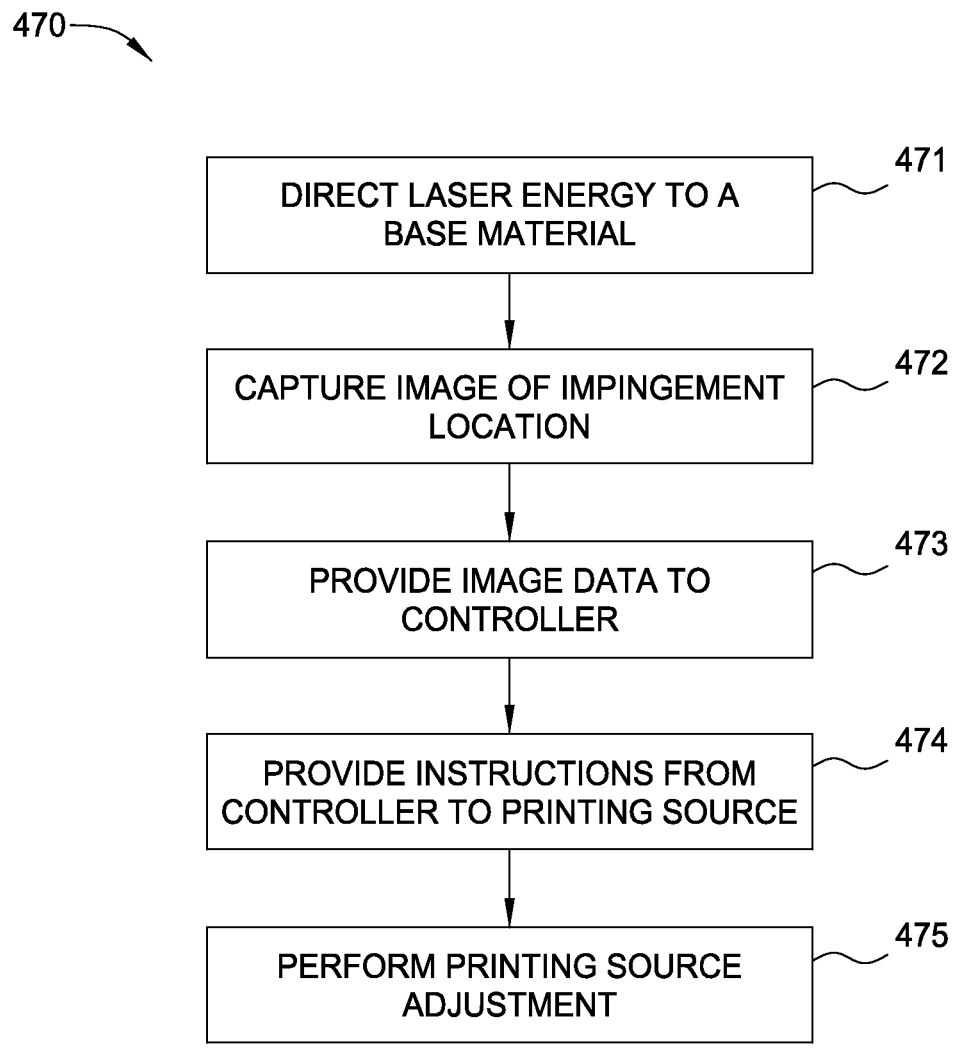
FIG. 4 is a flow diagram of a method for adjusting laser energy during a 3D printing process.

FIG. 4 is a flow diagram of a method 470 for adjusting laser energy during a 3D printing process. The method 470 begins at operation 471. In operation 471, laser energy from a laser is directed to a base material to melt the base material. The laser energy is directed to a specific location on the base material as specified by a controller to facilitate formation of a workpiece. As the laser energy is being directed, an imaging device captures an image of the impingement location upon the base material in operation 472. In operation 472, the captured image data is provided to the controller. In response to receiving the data, the controller analyzes the image data and performs one or more calculations based upon the received data. For example, the controller may determine angle of incidence, beam path length, beam shape at the base material contact location, polarization of the beam at the contact location, and estimated intensity of the beam at the contact location.

Subsequently, in operation 474, the controller may provide instructions to a printing source. The instructions dictate one or more adjustments to the printing source to effect a desired beam shape, position, intensity, polarization, and the like to facilitate consistent processing of the base material. In operation 475, in response to receiving the instructions, a printing source adjustment is performed. For example, one or more components of the optics assembly of the printing source, such as a beam-steering mechanism, a shape-controlling mechanism, a polarization mechanism, and an intensity controlling mechanism, may be adjusted. Subsequently, the method 470 may return to operation 471, and laser energy may be directed to the same location or a new location on the base material, thus 3D printing a desired object. In this manner, the method 470 is a closed loop function, thus facilitating increased control and accuracy during a 3D printing operation. The closed-loop transfer function is measured at the output by the imaging device. The output signal waveform can be calculated from the closed-loop transfer function and the input signal waveform provided by the controller.

Aspects of the present disclosure may take the form of an entirely hardware aspect, an entirely software aspect (including firmware, resident software, micro-code, etc.) or an aspect combining software and hardware aspects. Aspects of the disclosure may be embodied in a computer program product. A computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages.

Aspects of the present disclosure are described herein with reference to flowchart illustrations and/or block diagrams of methods, apparatuses, and computer program products according to aspects of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The controller described above is one such computer. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Benefits of aspects described herein include increased printing speeds for 3D printed components, particularly relative large components such as parts for aircraft. Moreover, because aspects described herein utilize a stationary workpiece support, the floor space required for 3D printing operations is minimized, and maintenance for a movable support is obviated.

While the foregoing is directed to aspects of the present disclosure, other and further aspects of the disclosure may be devised without departing from the basic scope thereof, and the scope thereof is determined by the claims that follow.

What is claimed is:

1. A three-dimensional printing apparatus, comprising:
   a material feed cartridge for containing a powdered base material;
   a workpiece support for supporting the powdered base material thereon;
   a laser for supplying laser energy to the powdered base material;
   an imaging device for capturing an image of the workpiece support;
   a controller for receiving image data from the imaging device; and
   an optics assembly coupled to the controller and adapted to receive instructions therefrom, the optics assembly comprising:
   a shape-controlling mechanism including a lens support having a plurality of gear teeth for rotating a lens;
   a polarization mechanism; and
   an intensity controlling mechanism configured to adjust an intensity of the laser energy supplied from the laser to the powdered base material, wherein the intensity controlling mechanism includes a polarization sensitive element and a plurality of gears that facilitate rotation of the polarization sensitive element.

2. The three-dimensional printing apparatus of claim 1, wherein the workpiece support is stationary when the laser energy is applied to the powdered base material.

3. The three-dimensional printing apparatus of claim 1, wherein the optics assembly further comprises a beam-steering mechanism.

4. The three-dimensional printing apparatus of claim 3, wherein the beam-steering mechanism comprises a plurality of rotatable mirrors.

5. The three-dimensional printing apparatus of claim 4, wherein the plurality of rotatable mirrors is two mirrors, and the two mirrors are rotatable about perpendicular axis.

6. The three-dimensional printing apparatus of claim 3, wherein the beam-steering mechanism comprises a steerable electro-evanescent optical refractor.

7. The three-dimensional printing apparatus of claim 1, wherein the shape-controlling mechanism, the polarization mechanism, the intensity controlling mechanism are adjustable in response to the instructions received by the controller.

8. The three-dimensional printing apparatus of claim 1, wherein the polarization mechanism comprises one or more rotatable polarization sensitive elements.

9. The three-dimensional printing apparatus of claim 8, wherein the one or more rotatable polarization sensitive elements is a plurality of axially aligned rotatable polarization sensitive elements.

10. The three-dimensional printing apparatus of claim 8, wherein the one or more rotatable polarization sensitive elements comprise a half wave plate or a quarter wave plate.

11. The three-dimensional printing apparatus of claim 1, wherein the shape-controlling mechanism comprises one or more rotatable housings each having a circular opening formed therein for accommodating the laser energy.

12. The three-dimensional printing apparatus of claim 11, wherein the shape-controlling mechanism comprises multiple rotatable housings that rotate about different axes.

13. The three-dimensional printing apparatus of claim 11, wherein the shape-controlling mechanism comprises an elliptical-shaped lens.

14. A three-dimensional printing apparatus, comprising:
   a material feed cartridge for containing a powdered base material;
   a workpiece support for supporting the powdered base material thereon;
   a laser for supplying laser energy to the powdered base material;
   an imaging device for capturing an image of the workpiece support;
   a controller for receiving image data from the imaging device; and
   an optics assembly coupled to the controller and adapted to receive instructions therefrom, the optics assembly comprising:
      a beam-steering mechanism comprising a plurality of actuatable mirrors;
      a shape-controlling mechanism comprising one or more rotatable housings each having a circular opening formed therein for accommodating the laser energy, and a lens support having a plurality of gear teeth for rotating a lens;
      a polarization mechanism comprising one or more rotatable polarization sensitive elements each having a gear mechanism that facilitates rotation of each polarization sensitive element; and
      an intensity controlling mechanism configured to adjust an intensity of the laser energy supplied from the laser to the powdered base material, wherein the workpiece support is stationary when the laser energy is applied to the powdered base material.

15. The three-dimensional printing apparatus of claim 14, wherein the actuatable mirrors of the beam-steering mechanism are rotatable.

16. The three-dimensional printing apparatus of claim 15, wherein the shape-controlling mechanism comprises multiple rotatable housings that are configured to rotate about different axes.

17. The three-dimensional printing apparatus of claim 16, wherein the one or more rotatable polarization sensitive elements comprise a half wave plate or a quarter wave plate.

18. A method of adjusting a laser during a 3D printing operation, comprising:
   providing a powdered base material onto a fixed workpiece support;
   directing laser energy from a printing source to the powdered base material on the fixed workpiece support;
   capturing an image of the fixed workpiece support;
   providing image data of the captured image to a controller;
   in response to the controller receiving the image data, providing instructions from the controller to the printing source to adjust one or more parameters of the printing source;
   adjusting an intensity of the laser energy supplied to the powdered base material with an intensity-controlling mechanism, wherein the intensity controlling mechanism includes a polarization sensitive element and a plurality of gears that facilitate rotation of the polarization sensitive element; and
   adjusting a beam shape of the laser energy using a shape-controlling mechanism that includes a lens support having a plurality of gear teeth for rotating a lens.

19. The method of claim 18, wherein the intensity controlling mechanism comprises a plurality of polarization units each having the polarization sensitive element disposed therein.

20. The method of claim 19, further comprising adjusting a beam-steering mechanism.

* * * * *